United States Patent [19]
Spear et al.

[11] Patent Number: 5,975,601
[45] Date of Patent: Nov. 2, 1999

[54] ONE-PIECE HAND-HELD GARDENING TOOL

[75] Inventors: Kenneth J Spear, Vienna, W. Va.; Frank G Czerwinski, Parkersburg, W. Va.

[73] Assignee: O. Ames Co., Parkersburg, W. Va.

[21] Appl. No.: 09/063,889

[22] Filed: Apr. 22, 1998

[51] Int. Cl.$^6$ ................................ A01B 1/02; B25G 1/00
[52] U.S. Cl. ................................ 294/49; 294/55; 294/57; 16/DIG. 19
[58] Field of Search ................................ 294/49, 54.5, 55, 294/57, 7; 15/143.1; 16/110 R, 111 R, DIG. 12, DIG. 19; 76/113, 119, DIG. 7; 264/572

[56] References Cited

U.S. PATENT DOCUMENTS

| | | | |
|---|---|---|---|
| D. 349,222 | 8/1994 | Linden et al. . | |
| D. 354,661 | 1/1995 | Linden et al. . | |
| 1,620,480 | 3/1927 | Matthai | 294/49 |
| 1,735,210 | 11/1929 | Nims | 294/49 |
| 1,983,815 | 12/1934 | Schmiett | 294/49 |
| 3,549,189 | 12/1970 | Alosi . | |
| 4,280,727 | 7/1981 | Germain | 294/54.5 |
| 4,498,860 | 2/1985 | Gahan . | |
| 4,740,150 | 4/1988 | Sayer . | |
| 4,824,732 | 4/1989 | Hendry et al. . | |
| 4,923,666 | 5/1990 | Yamazaki et al. . | |
| 4,923,667 | 5/1990 | Sayer . | |
| 4,950,013 | 8/1990 | Yonkers . | |
| 4,969,675 | 11/1990 | Zahrowski | 294/55 |
| 4,993,768 | 2/1991 | Ewen . | |
| 5,211,118 | 5/1993 | Perkins . | |
| 5,305,490 | 4/1994 | Lundgren | 15/143.1 |
| 5,547,240 | 8/1996 | Hartshorn et al. . | |
| 5,622,298 | 4/1997 | Cucheran et al. | 264/572 |
| 5,737,803 | 4/1998 | Tisdale | 16/DIG. 12 |

FOREIGN PATENT DOCUMENTS

| | | | |
|---|---|---|---|
| 6056-832 | 5/1981 | Japan | 264/572 |

*Primary Examiner*—Dean J. Kramer
*Attorney, Agent, or Firm*—Pillsbury Madison & Sutro LLP

[57] ABSTRACT

The present invention is a one-piece hand-held gardening tool comprising a rigid, high strength tool portion to be used as an implement in gardening activities and a rigid, high strength annular handle portion to be manually grasped when the tool portion is used as an implement in gardening activities. The handle portion and the tool portion are molded integrally together from a molten material which provides the rigid, high strength tool portion and the rigid, high strength annular handle portion with suitable strength and rigidity for use in gardening activities when solidified. The handle portion has a hollow cavity surrounded by an annular, outer wall. The hollow cavity is formed in the handle portion by injecting pressurized gas into the molten material from which the rigid, high strength tool portion and the rigid, high strength annular handle portion are integrally molded before the solidification thereof. The hollow cavity is substantially enclosed within the handle portion to thereby prevent dirt and debris from collecting therein. The annular, outer wall surrounding the hollow cavity has a thickness suitable to provide the rigid, high strength annular handle portion with suitable strength and rigidity for use in gardening activities. The one-piece hand-held gardening tool is molded from less of the molten material than would be used to mold a substantially identical one-piece hand-held gardening tool devoid of hollow cavities and weighs less than the substantially identical one-piece hand-held gardening tool devoid of hollow cavities by virtue of forming the hollow cavity in the rigid, high strength annular handle portion thereof.

12 Claims, 6 Drawing Sheets

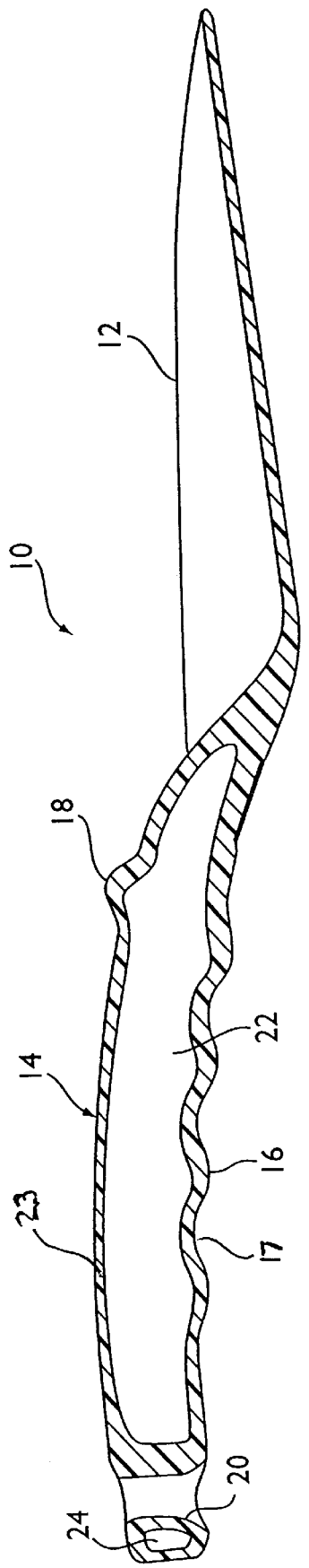
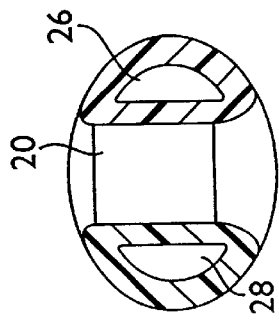
FIG. 2A
FIG. 2B

ONE-PIECE HAND-HELD GARDENING TOOL

The present invention relates to gardening tools and, more particularly, one-piece hand-held gardening tools.

Gardening tools such as hand shovels, planter's trowels, and cultivating claws are commonly used in planting and maintaining a garden. Typically, such gardening tools comprise a metal tool portion fixed to a wood or plastic handle portion by a fastener. Oftentimes, the fasteners attaching the tool portion can become loose. In addition, although metal tool portions usually have sufficient strength and rigidity, they can become rusted if exposed to moisture for an extended period of time. It is thus desirable to provide a non-metallic gardening tool which is formed in one integral piece yet has a suitable strength and rigidity to be used gardening.

The plastic handles of conventional garden tools usually have ribs on a lower portion thereof. These ribs are utilized to provide the handle portion with suitable structural rigidity while reducing the amount of material used to mold it. It is particularly advantageous to use less material than required to form an entirely solid handle portion in order to reduce the weight of the tool and the costs of material. However, dirt and other debris tends to collect in between these ribs when gardening. Thus, there exists a need for a one-piece, non-metallic gardening tool with a handle which has a suitable structural rigidity and is formed from a reduced amount of material, but does not have ribs in which dirt and debris can collect.

It is therefore an object of the present invention to meet the needs and desires described above. The present invention is a one-piece hand-held gardening tool comprising a rigid, high strength tool portion constructed and arranged to be used as an implement in gardening activities and a rigid, high strength annular handle portion constructed and arranged to be manually grasped when the tool portion is used as an implement in gardening activities. The handle portion and the tool portion are molded integrally together from a molten material which provides the rigid, high strength tool portion and the rigid, high strength annular handle portion with suitable strength and rigidity for use in gardening activities when solidified.

The handle portion has a hollow cavity surrounded by an annular, outer wall. The hollow cavity is formed in the handle portion by injecting pressurized gas into the molten material from which the rigid, high strength tool portion and the rigid, high strength annular handle portion are integrally molded before the solidification thereof. The hollow cavity is substantially enclosed within the rigid, high strength handle portion to thereby prevent dirt and debris from collecting therein. The annular, outer wall surrounding the hollow cavity has a thickness suitable to provide the rigid, high strength annular handle portion with suitable strength and rigidity for use in gardening activities. The one-piece hand-held gardening tool is molded from less of the molten material than would be used to mold a substantially identical one-piece hand-held gardening tool devoid of hollow cavities and weighs less than the substantially identical one-piece hand-held gardening tool devoid of hollow cavities by virtue of forming the hollow cavity in the rigid, high strength annular handle portion thereof.

DESCRIPTION OF THE DRAWINGS

FIG. 2A is a cross-section viewed in the direction IIa—IIa of FIG. 1;

FIG. 2B is a cross-section viewed in the direction IIb—IIb of FIG. 1;

DESCRIPTION OF THE PREFERRED EMBODIMENTS

One-piece hand-held tools according to the present invention can assume a number of configurations. Three such configurations, representing three embodiments of the present invention, are shown in FIGS. 1–6.

Figure 1:
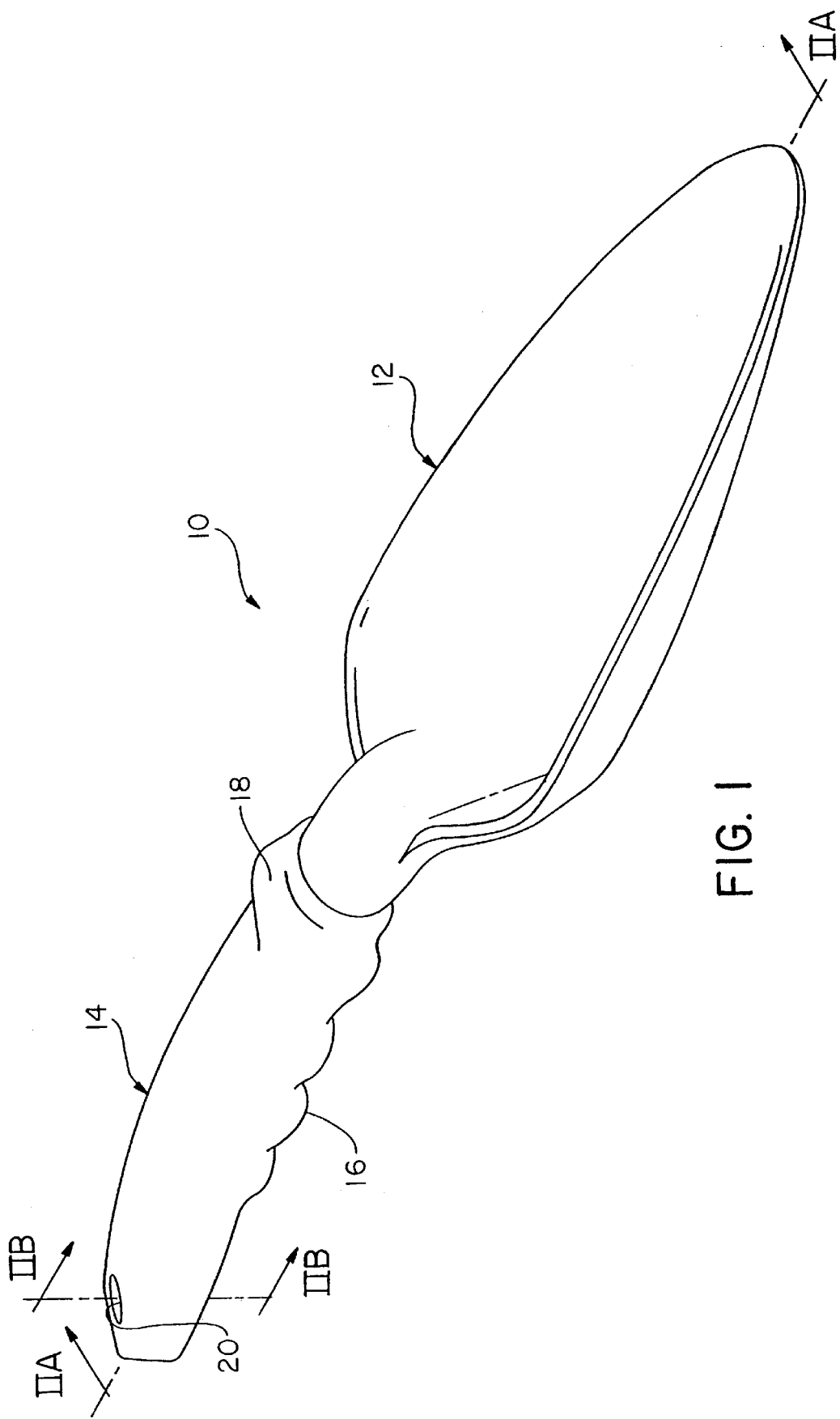
FIG. 1 is a perspective view of a one-piece and-held hand shovel according to the present invention.

A hand shovel 10, suitable for gardening and the like, is shown in FIG. 1. Hand shovel 10 comprises an integral one-piece construction including a rigid, high strength tool portion in the form of a shovel blade 12 and a rigid, high strength annular handle portion 14. Shovel blade 12 has a structure similar to that of conventional hand shovels, that is, it tapers away from the handle portion 14 to a rounded off pointed tip and has a curved surface that is attached to the handle 14 at the end opposite the tip. The shovel blade 12 is designed such that a user grasping the handle portion 14 can push the blade 12 into the ground and scoop soil up therefrom in order to dig a hole. The bottom surface of the annular handle portion 14 preferably includes a series of rounded, spaced apart projections 16 with rounded spaced apart projections disposed therebetween. A user can manually grasp the handle portion 14 with his fingers manually engaging the rounded, spaced apart indentations 17 and the rounded, spaced apart projections 16 to thereby provide the user with a comfortable, secure grip when using the tool 10. In addition, a single, rounded projection 18 is preferably provided on a top surface of the handle portion 14. A user may place his or her thumb against the single rounded projection 18 to provide more stability when pushing the shovel blade 12 axially into a medium offering significant resistance, such as packed soil.

Handle portion 14 also preferably includes a hanging hole 20 extending transversely through the end of the handle opposite the blade 12. Hanging hole 20 provides a convenient means for hanging the tool on a hook on a wall when not in use. In addition, a wrist strap (not shown) can be secured to the hand shovel 10 at the hanging hole 20.

A cross-section of the hand shovel 10 is shown in FIG. 2A. Hand shovel 10 is composed of a molded composite material, preferably glass reinforced nylon. Shovel 10 is constructed by a gas assist injection molding process, variations of which are described in U.S. Pat. Nos. 4,923,667; 4,923,666; 4,824,732; and 4,740,150, the disclosures of which are hereby incorporated by reference. During gas-assisted injection molding, a stream of molten material is injected into a mold. Pressurized gas is supplied into the interior of the molten material to form a hollow cavity therein. The material is allowed to cool sufficiently to maintain the shape dictated by the mold and the gas within the cavity is then vented to reduce the pressure to the ambient pressure prior to opening the mold.

The gas assist injection molding process produces a molded article having a smooth and consistent outer surface and further having a hollow cavity 22 inside the annular handle portion 14. The handle portion 14 and the shovel blade 12 are molded integrally together from a molten material which provides the rigid, high strength shovel blade 12 and the rigid, high strength annular handle portion 14 with suitable strength and rigidity for use in gardening activities when solidified. The hollow cavity 22 is surrounded by an annular, outer wall 23 and formed by injecting pressurized gas into the molten material before it solidifies according to the above-described gas assisted injection molding process. The hollow cavity 22 is substantially enclosed within the rigid, high strength handle portion to thereby prevent dirt and debris from collecting therein.

The hollow cavity 22 reduces the weight of the shovel 10 and also reduces the amount of material needed to form the tool and reduces the cycle time in comparison to a gardening tool which is devoid of such hollow cavities and solid throughout, thus reducing the product manufacturing cost. Obviously, the larger the hollow cavity 22, the less material necessary to manufacture the hand shovel 10 and the less the weight of the shovel will be. It can be appreciated, however, that as the hollow cavity 22 becomes larger, the annular, outer wall 23 becomes thinner. It is presently contemplated that a minimum wall thickness of 0.1" is necessary to maintain the structural integrity and durability of the tool. Regardless, it is within the scope of the present invention that the thickness of the annular, outer wall 23 be suitable to provide the rigid, high strength annular handle portion 14 with sufficient strength and rigidity to be used in gardening activities. As shown in FIGS. 2A and 2B, the area disposed circumferentially around hanging hole 20 is preferably also hollow including hollow portions 24, 26, and 28. It can be appreciated, however, that, provided that no resin material fills or blocks off any hollow portions inside the handle portion, the hollow portions 22, 24, 26, and 28 comprise one continuous hollow portion inside the handle.

Figure 3:
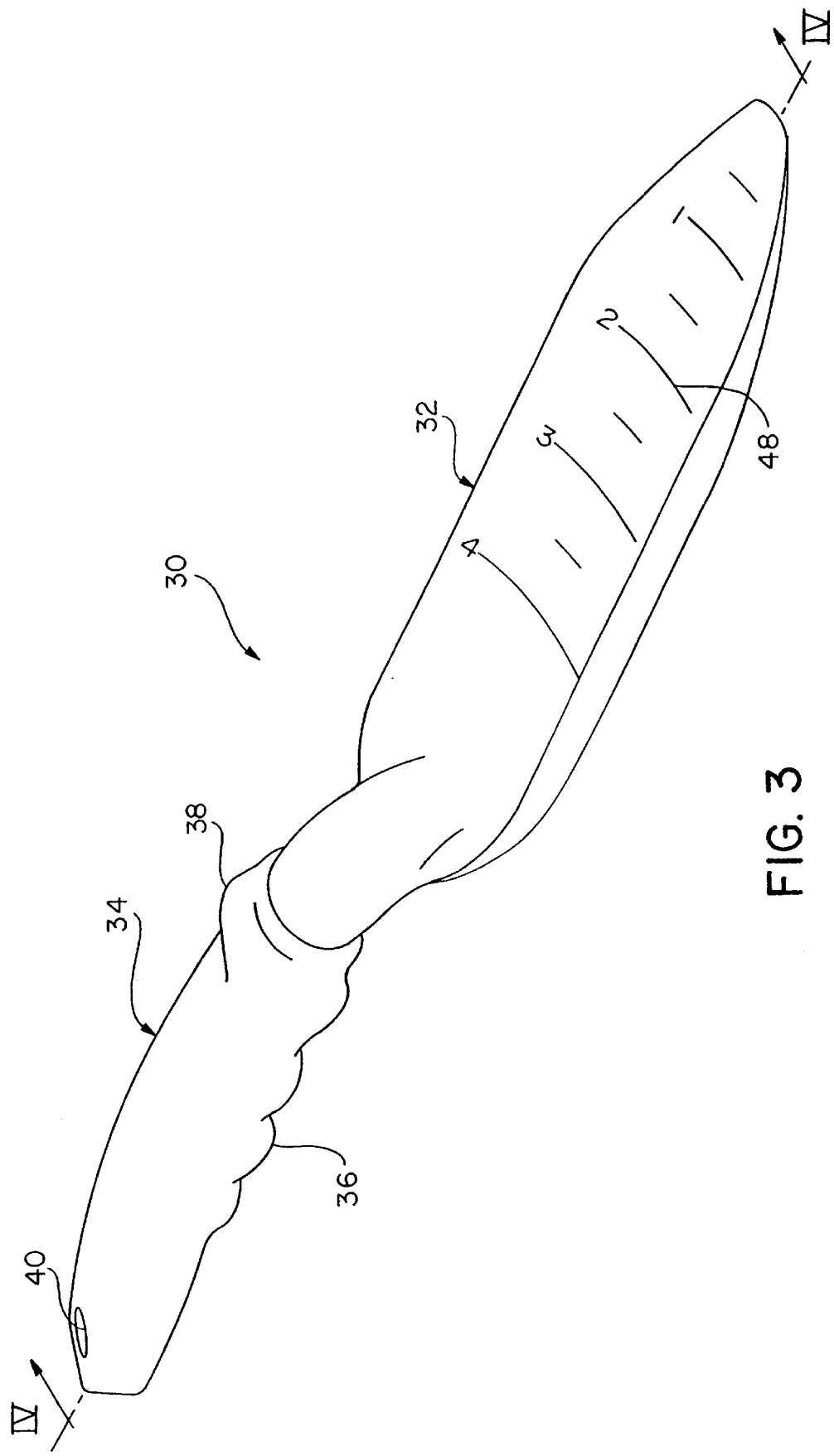
FIG. 3 is a perspective view of a one-piece hand-held planter's trowel according to the present invention.

Another embodiment of an injection molded composite hand tool according to the present invention is shown in FIG. 3. A planting trowel 30, useful for planting seeds, bulbs, or small seedlings at prescribed soil depths, is shown in FIG. 3. Planting trowel 30 includes a handle portion 34 and a trowel blade 32. Blade 32 is preferably narrower than the blade 12 of the hand shovel 10 described above. The narrow blade 32 is particularly suited to digging narrow holes in soil for planting seeds, bulbs, and seedlings. In addition, the blade 32 of the planter's trowel 30 preferably includes a series of gradient markings 48 to assist the user in planting the seeds, bulbs, or seedlings at a prescribed depth in the soil.

Like the handle portion 14 of the shovel 10, handle portion 34 also includes a plurality of rounded, spaced apart projections 36 formed on the bottom surface thereof and rounded, spaced apart indentations 37 defined therebetween. A single, rounded projections 38 is provided on the upper surface of the handle portion 34 similar to the handle portion 14 of the shovel 10. In addition, handle portion 34 preferably includes a hanging hole 40, useful for hanging the planter's trowel 30 thereon and/or attaching a wrist strap (not shown) thereto.

Figure 4:
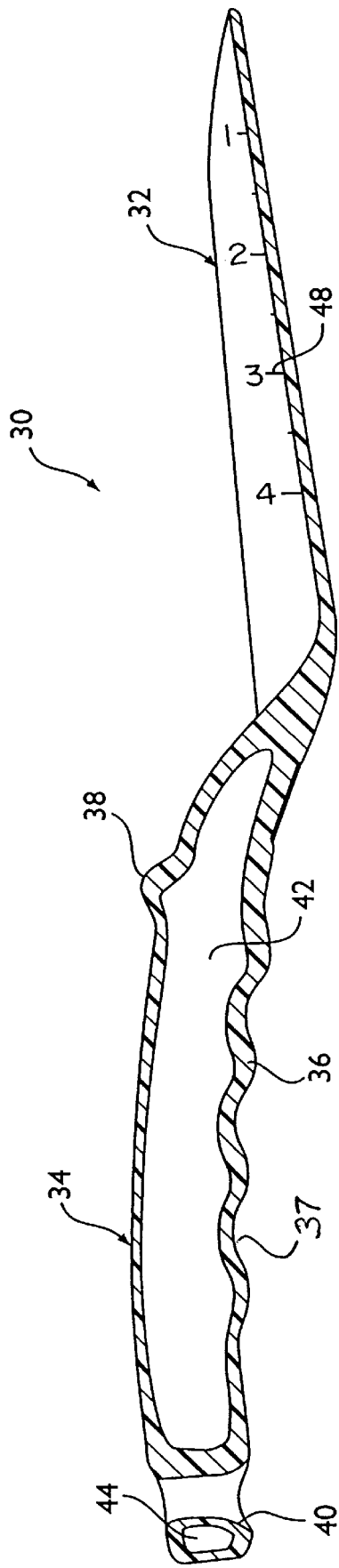
FIG. 4 is a cross-section viewed in the direction IV—IV in FIG. 3.

A cross-section of the planter's trowel 30 is shown in FIG. 4. Again, the trowel blade 32 and handle portion 34 of the planter's trowel 30 are of a single integral molded structure. The planter's trowel 30 is composed of a molded composite material, preferably glass-reinforced nylon and is formed by the above-described gas assist injection molding process. The gas assist injection molding process creates hollow cavities in the handle portion 34 such as hollow cavity 42 and hollow cavity 44 which, under ideal conditions, constitute a single continuous hollow cavity extending throughout the handle portion 34 and around hanging hole 40. The hollow cavities 42, 44 in the handle portion 34 reduce the weight of the planting trowel 30 and reduce the amount of material needed to form the planter's trowel.

Figure 5:
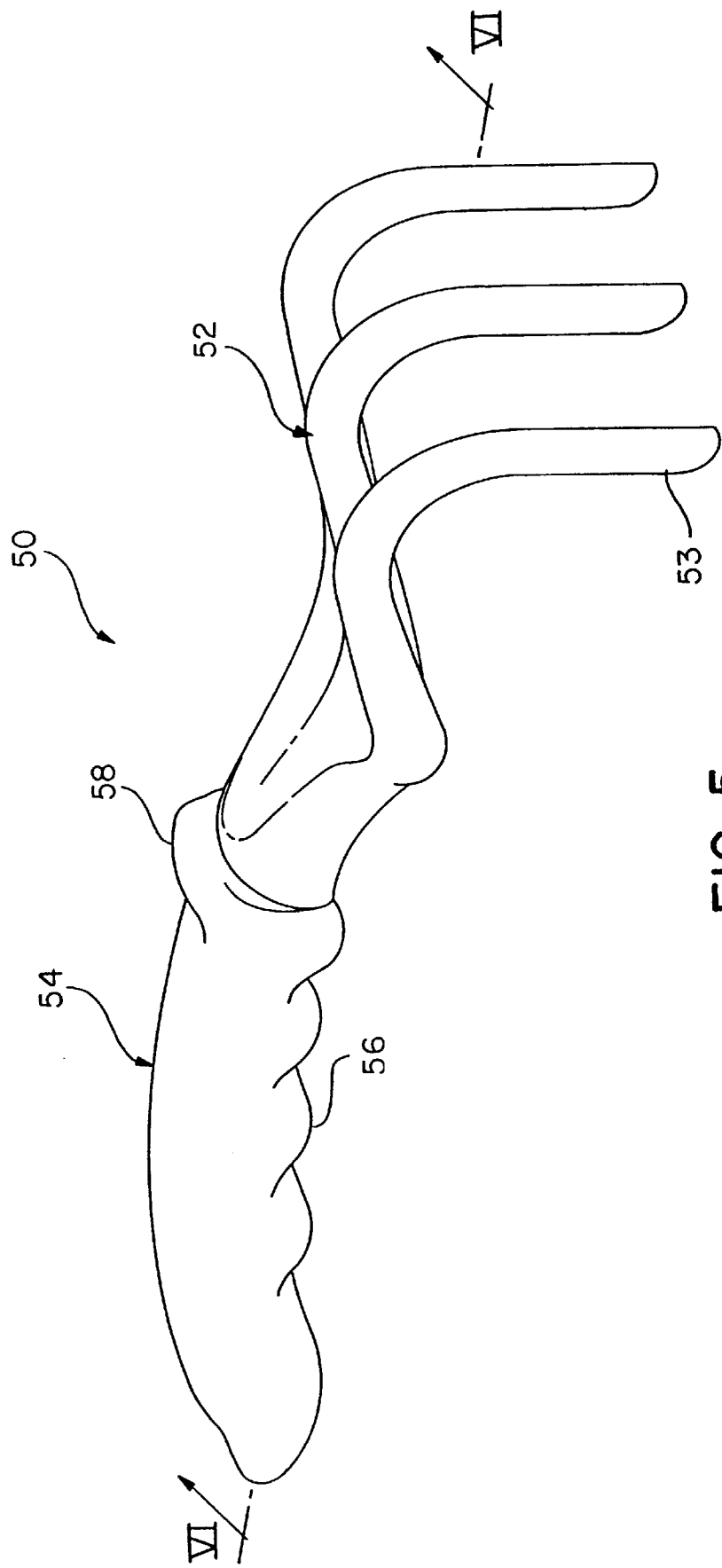
FIG. 5 is a perspective view of a one-piece hand-held cultivator according to the present invention.

A third embodiment of the molded composite hand tool according to the present invention is shown in FIG. 5. A hand cultivator 50 includes a handle portion 54 and a cultivating claw end 52 which comprises a plurality of tines 53 extending for an extent longitudinally with respect to the tool 50 and terminating in a transverse portion with respect to the tool 50. The hand cultivator 50 preferably includes three such cultivating tines 53.

Like the handle portion 14 of the shovel 10, the handle portion 54 includes a plurality of rounded, spaced apart projections 56 and rounded, spaced apart indentations 57 defined therebetween disposed on the bottom surface thereof and a single rounded projection 58 disposed on the upper surface thereof.

Figure 6:
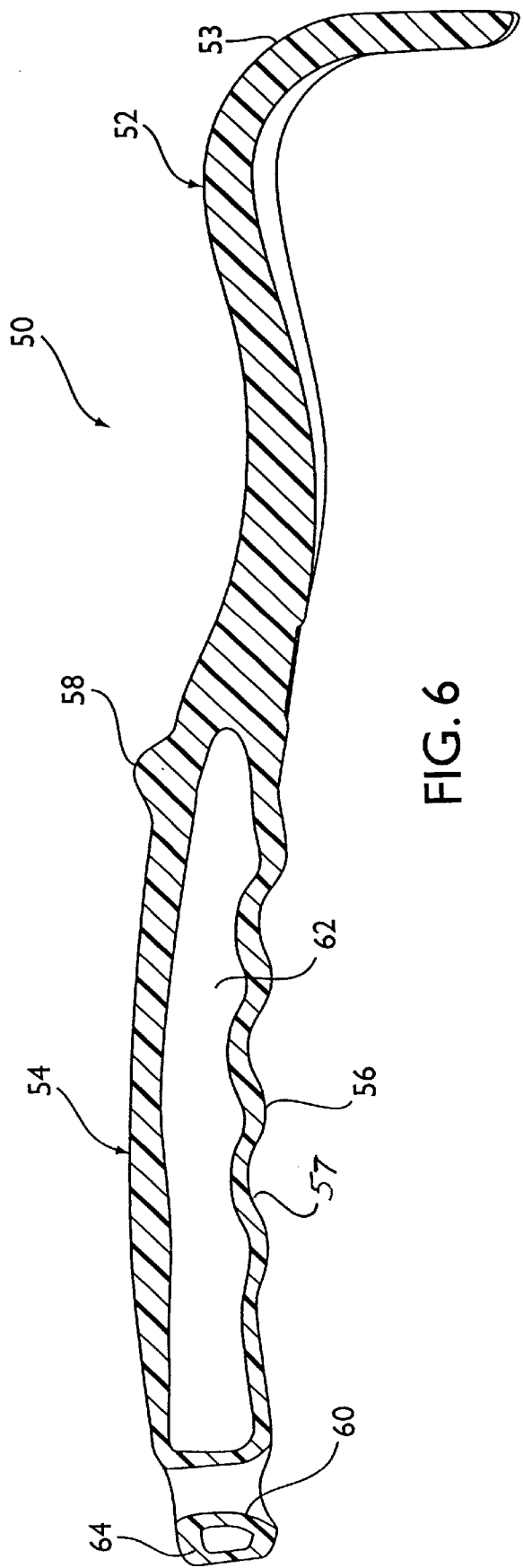
FIG. 6 is a cross-section in the direction VI—VI of FIG. 5.

A cross-section of the hand cultivator 50 is shown in FIG. 6. As can be seen in the illustrated embodiment, handle portion 54 preferably includes a hanging hole 60 useful for hanging the hand cultivator 50 thereon and/or attaching a wrist strap (not shown) thereto. The cultivating claw 52 and the handle portion 54 of the hand cultivator 50 are integrally molded as a single piece. The hand cultivator 50 is preferably formed of a composite material preferably glass-reinforced nylon, and is formed by the above-described gas-assist injection molding process. The gas-assist injection molding process creates a hollow cavity 62 in the handle portion 54 which minimizes the weight of the hand cultivator 50 and also minimizes the amount of material required to form the hand cultivator 50. The gas-assist injection molding process also produces hollow cavities 64 and 62 which, under ideal conditions, are continuous throughout the handle portion 54 and around the hanging hole 60.

Any U.S. Patents or patent applications mentioned or cited hereinabove are hereby incorporated by reference into the present application.

It will thus be seen that the objects of this invention have been fully and effectively accomplished. It will be realized, however, that the foregoing preferred specific embodiments have been shown and described for the purposes of illustrating the functional and structural principles of this invention and are subject to change without departure from such principles. Therefore, this invention includes all modifications encompassed within the spirit and scope of the following claims.

What is claimed:

1. A one-piece hand-held gardening tool comprising:
   a rigid, high strength tool portion constructed and arranged to be used as an implement in gardening activities; and
   a rigid, high strength annular handle portion constructed and arranged to be manually grasped with one hand when said tool portion is used as an implement in gardening activities,
   said handle portion and said tool portion being molded integrally together from a molten material which provides said rigid, high strength tool portion and said rigid, high strength annular handle portion with suitable strength and rigidity for use in gardening activities when solidified, said handle portion and said tool portion being dimensioned and configured to be suitable for one-handed use during gardening activities,
   said handle portion having a hollow cavity surrounded by an annular, outer wall, said hollow cavity being formed in said handle portion by injecting pressurized gas into the molten material from which said rigid, high strength tool portion and said rigid, high strength annular handle portion are integrally molded before the solidification thereof, said hollow cavity being substantially enclosed within said rigid, high strength handle portion to thereby prevent dirt and debris from collecting therein, said hollow cavity extending along at least a majority of a longitudinal extent of said handle portion, said annular, outer wall surrounding said hollow cavity having a thickness suitable to provide said rigid, high strength annular handle portion with suitable strength and rigidity for one-handed use in gardening activities, said one-piece hand-held gardening tool being molded from less of said molten material than would be used to mold a substantially identical one-piece hand-held gardening tool devoid of hollow cavities and weighing less than the substantially identical one-piece hand-held gardening tool devoid of hollow cavities by virtue of forming said hollow cavity in said rigid, high strength annular handle portion thereof.

2. A one-piece hand-held gardening tool according to claim 1 wherein the molten material from which said rigid, high strength handle portion and said rigid, high strength tool portion are integrally molded is a molded composite material which provides said rigid, high strength tool portion and said rigid, high strength handle portion with suitable strength and rigidity for one-handed use in gardening activities when solidified.

3. A one-piece hand-held gardening tool according to claim 2 wherein the molded composite material is glass reinforced nylon.

4. A one-piece hand-held gardening tool according to claim 3 wherein said annular, outer wall of said handle portion surrounding said hollow cavity has a minimum thickness of 0.1 inches.

5. A one-piece hand-held gardening tool according to claim 4 wherein said handle portion has a hanging hole formed therethrough at an end thereof opposite said tool portion, said hanging hole being positioned and configured to removably receive a hanging hook mounted on a wall to thereby hang said one-piece hand-held gardening tool on the wall.

6. A one-piece hand-held gardening tool according to claim 5 wherein said hollow cavity formed in said handle portion extends circumferentially around said hanging hole.

7. A one-piece hand-held gardening tool according to claim 4 wherein said handle portion comprises a series of rounded, spaced apart projections formed on a bottom surface thereof, said rounded, spaced apart projections defining rounded, spaced apart indentations therebetween, said rounded, spaced apart projections and said rounded, spaced apart indentations being positioned and configured such that a user can manually grasp said handle portion with his fingers manually engaging said rounded, spaced apart indentations and said rounded, spaced apart projections to thereby provide the user with a comfortable, secure grip when one-handed by using said one-piece hand-held gardening tool.

8. A one-piece hand-held gardening tool according to claim 7 wherein said series of rounded, spaced apart projections includes four rounded, spaced apart projections with three rounded, spaced apart indentations therebetween.

9. A one-piece hand-held gardening tool according to claim 7 wherein said handle portion further comprises a single, rounded projection formed on a top surface thereof at an end adjacent said tool portion, said single, rounded projection being positioned and configured such that the user manually grasping said handle portion with his fingers manually engaged with said rounded, spaced apart indentations and said rounded, spaced apart projections on the bottom surface thereof can manually engage said single, rounded projection with his thumb to thereby provide more stability when pushing said tool portion into a medium offering significant resistance.

10. A one-piece hand-held gardening tool according to claim 9 wherein said tool portion is a shovel blade molded integrally with said handle portion, said shovel blade being tapered away from said handle portion to a rounded tip thereof, said shovel blade being constructed and arranged such that the user manually grasping said handle portion can push said shovel blade into the ground and scoop soil up therefrom in order to dig a hole.

11. A one-piece hand-held gardening tool according to claim 9 wherein said tool portion is a narrow planter's trowel blade molded integrally with said handle portion, said narrow planter's trowel blade being tapered away from said handle portion to a rounded tip thereof, said narrow planter's trowel blade being constructed and arranged such that the user manually grasping said handle portion can push said narrow planter's trowel blade into the ground and scoop soil up therefrom in order to dig a hole therein, said narrow planter's trowel blade having gradient markings on an upper surface thereof to indicate a depth at which the narrow planter's trowel blade is being inserted into the ground.

12. A one-piece hand-held gardening tool according to claim 9 wherein said tool portion is a cultivating claw having a plurality of tines, said cultivating claw being constructed and arranged such that the user manually grasping said handle portion can drag said tines through soil to thereby break the soil up as the tines are dragged along.

* * * * *